United States Patent [19]

Moran, Jr. et al.

[11] 4,071,041
[45] Jan. 31, 1978

[54] BALL VALVE SEAT RING CONSTRUCTION

[75] Inventors: George A. Moran, Jr.; Willard J. Sitton, both of Houston, Tex.

[73] Assignee: ACF Industries, Incorporated, New York, N.Y.

[21] Appl. No.: 647,286

[22] Filed: Jan. 7, 1976

[51] Int. Cl.² ............................................. F16K 5/22
[52] U.S. Cl. .............................. 137/246.22; 251/174; 251/360; 267/152; 267/166
[58] Field of Search ............... 251/174, 359, 360, 364; 137/246.22, 315; 267/1.5, 152, 166, 177; 29/157.1

[56] References Cited

U.S. PATENT DOCUMENTS

| | | | |
|---|---|---|---|
| 2,247,543 | 7/1941 | Bernstein | 267/152 X |
| 2,628,060 | 2/1953 | Parker | 251/174 |
| 3,335,999 | 8/1967 | Lowrey | 251/174 X |
| 3,416,558 | 12/1968 | Works | 137/246.22 |
| 3,416,783 | 12/1968 | Tondato | 267/152 X |
| 3,580,541 | 5/1971 | Bouhot | 251/174 |
| 3,732,885 | 5/1973 | Allen | 137/315 |
| 3,752,178 | 8/1973 | Grove | 137/246.22 |

*Primary Examiner*—Harold W. Weakley
*Attorney, Agent, or Firm*—Eugene N. Riddle

[57] ABSTRACT

A spherical plug valve has an annular seat pocket in its body around a flow passageway. A seat ring is positioned in the seat pocket and includes inner and outer annular concentric seat members with a resilient seal ring secured between the concentric seat members. The concentric seat members are secured together by rivets after the seal ring is positioned therebetween. A separate resilient seat urging member in the seat pocket behind the seat ring urges the seal into engagement with the adjacent face of the spherical valve and includes a metal spring encapsulated in an elastomeric material.

6 Claims, 8 Drawing Figures

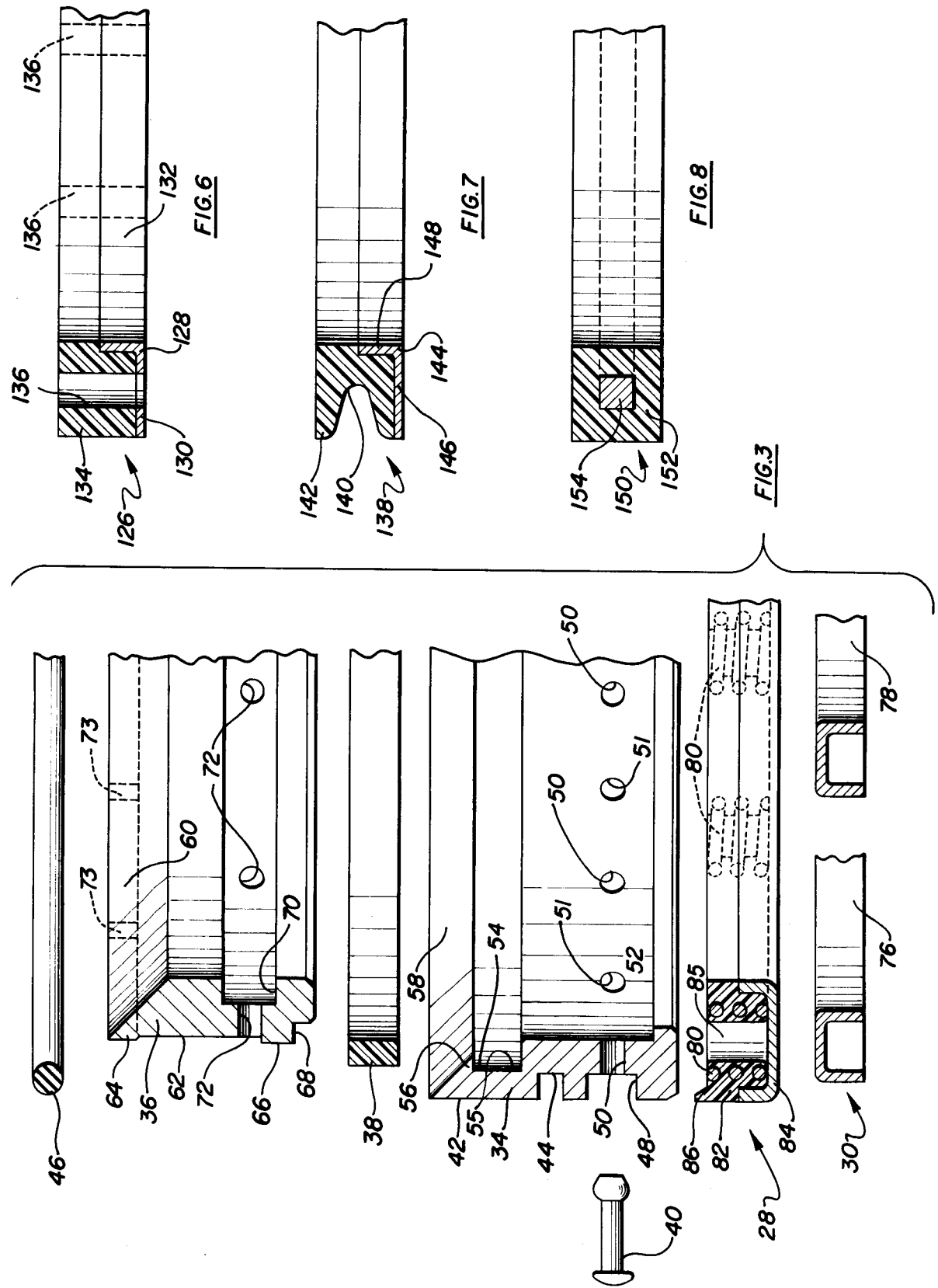

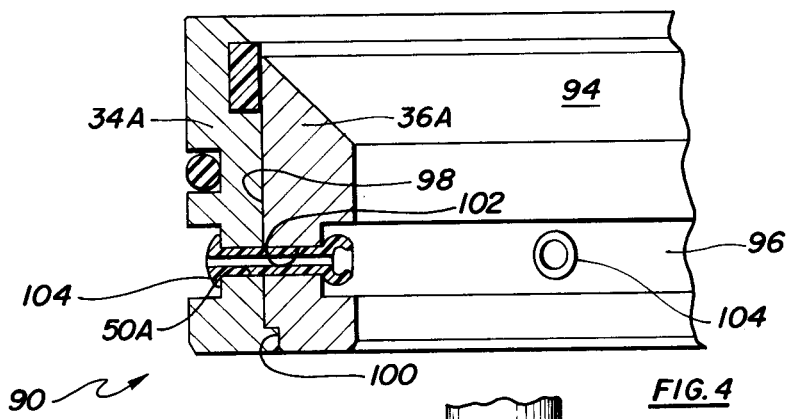
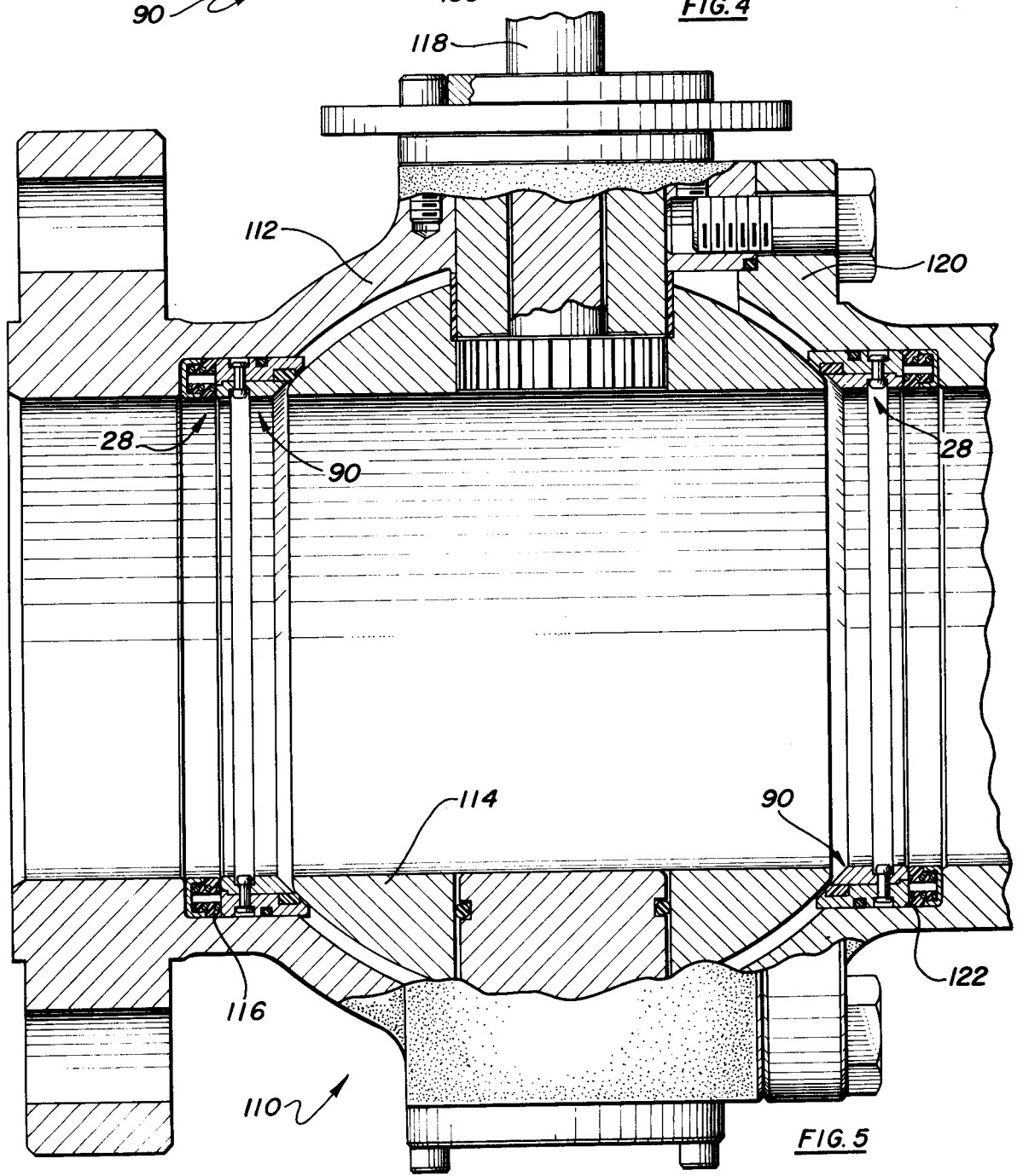

BALL VALVE SEAT RING CONSTRUCTION

BACKGROUND OF THE INVENTION

This invention is related to face seal and seat structures for ball valves or spherical plug valves wherein the seat ring is constructed of separate pieces and resiliently urged toward the valve member. This invention is also related to springs for valve seat rings which urges or biases the seat ring toward the valve member from behind the seat ring in the seat pocket.

Prior art spherical plug valve seat rings are typically constructed of a single piece annular member and placed in the valve seat pocket. In another typical construction, the seat ring structure includes a resilient sealing element pressed into a one-piece seat ring. In these two-piece constructions, the mounting of the seal ring is difficult in that it must be pressed into a groove in the seat ring or it must be placed into a groove in the seat ring and then the seat ring deformed to grip or secure the seal ring. In the latter construction it is desirable because of the choice of seal ring shapes available. However, this construction is not desirable because from a manufacturing standpoint, it is difficult to consistently mass produce. In regard to the urging means for seat rings it is quite common in the art to use wave springs or a plurality of spaced helical springs behind a seat ring to urge it towards a valve member. In these constructions they function well until foreign matter becomes lodged in the seat pocket around the springs at which point the seat ring becomes essentially fixed in its position and does not operate as required.

SUMMARY OF THE INVENTION

One embodiment of the seat ring structure of this invention is constructed in a three-piece fashion comprised of an inner annular seat ring member resting in a nesting relation inside of a concentric outer seat ring member and having an annular seal ring mounted therebetween with the concentric inner and outer seat ring members being ridigly secured together, preferably by rivets. In the valve body a seat pocket is formed around the flow passageway and an annular resilient member fills the seat pocket behind the seat ring in order to urge the seat ring toward the spherical plug member. The resilient member includes an elastomeric material bonded to a metallic element to provide a rigidity to the elastomeric material. The metallic element comprises a plurality of metallic coiled springs encapsulated in an elastomeric material in one embodiment. For top and bottom entry style valves, a segmented spacer is provided in the seat pocket to allow for the retraction of the seat rings to facilitate insertion and removal of the spherical plug member. For end entry style valves the spacer member is not used.

One object of this invention is to provide a valve seat ring construction overcoming the aforementioned disadvantages of the prior art devices.

Still, one other object of this invention is to provide a spherical plug valve face seat and seal construction having a two-piece ring structure which is rigidly secured together to retain a seal ring.

Still, another object of this invention is to provide a valve seat ring construction having a resilient member positioned in the seat pocket behind the seat ring essentially completely filling the seat pocket and urging the seat ring toward the valve member to prevent the influx of foreign material behind the seat ring.

Various other objects, advantages, and features of this invention will become apparent to those skilled in the art from the following discussion, taken in conjunction with the accompanying drawings, in which:

DESCRIPTION OF THE DRAWINGS

FIG. 3 is an exploded view of the seat ring structure shown in FIG. 2 and including the resilient member and spacer with portions thereof shown in cross section;

FIG. 4 is an enlarged elevation of a segment of the seat ring of another embodiment of this invention for use in non-lubricated style valves with portions thereof shown in cross section;

FIG. 5 is a cross-sectional view of an end entry ball valve employing the seat construction of this invention;

FIG. 6 is a cross-sectional view of another embodiment of the resilient member for urging the seat ring outwardly with a portion thereof shown in elevation;

FIG. 7 is a cross-sectional view of a portion of a further embodiment of a resilient member for urging the seat ring of this invention outwardly with a portion thereof shown in elevation; and FIG. 8 is a cross-sectional view of an additional embodiment of a resilient member employed for urging outwardly the seat ring construction of this invention and showing a portion thereof in elevation.

The following is a discussion and description of preferred specific embodiments of the seat ring construction of this invention, such being made with reference to the drawings whereupon the same referenced numerals are used to indicate the same or similar parts and/or structure. It is to be understood that such discussion and description is not to unduly limit the scope of the invention.

DETAILED DESCRIPTION

Figure 1:
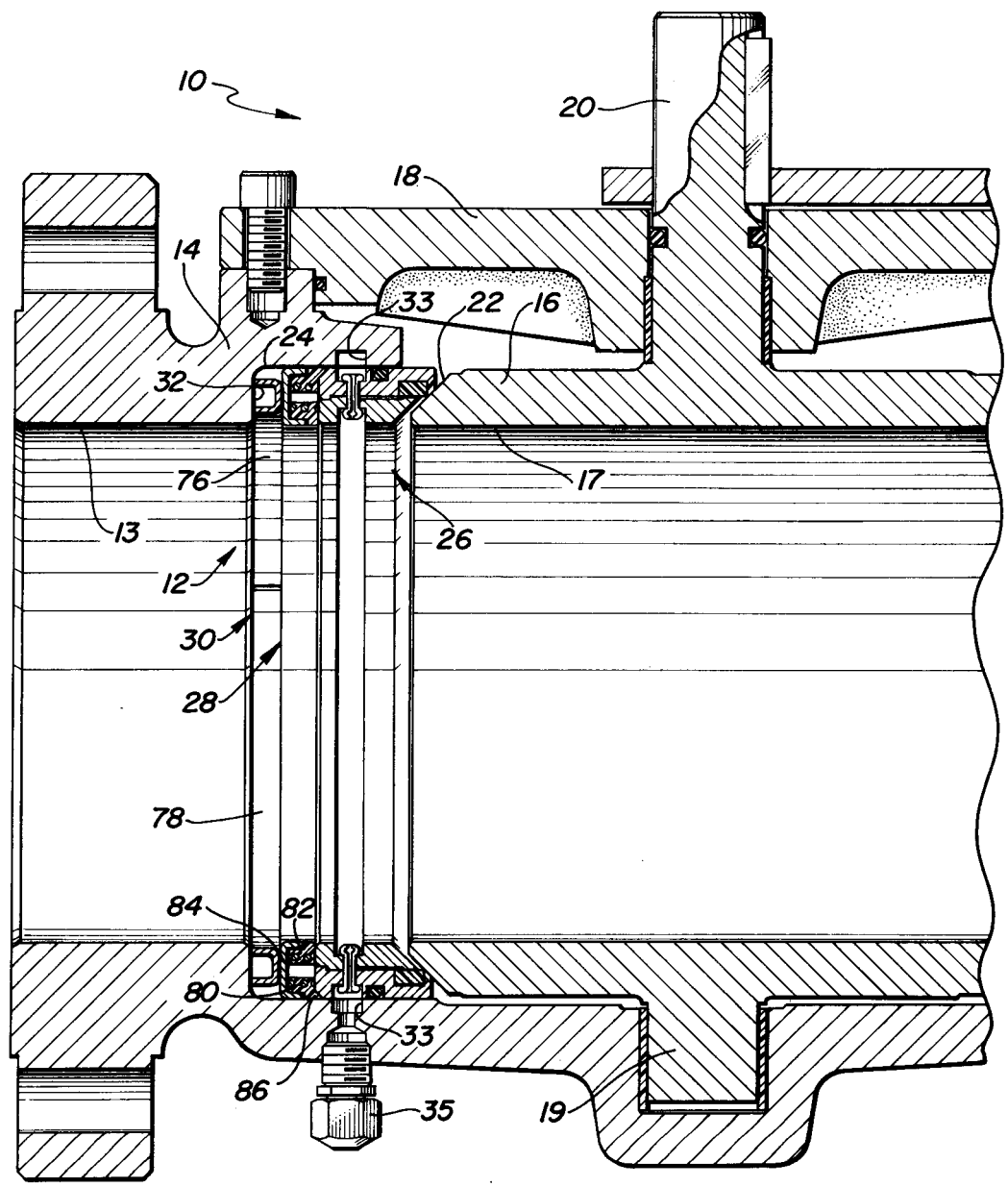
FIG. 1 is a cross-sectional view of a portion of a top entry style spherical plug valve employing the seat ring construction of one embodiment of this invention for a lubricated valve.
Figure 2:
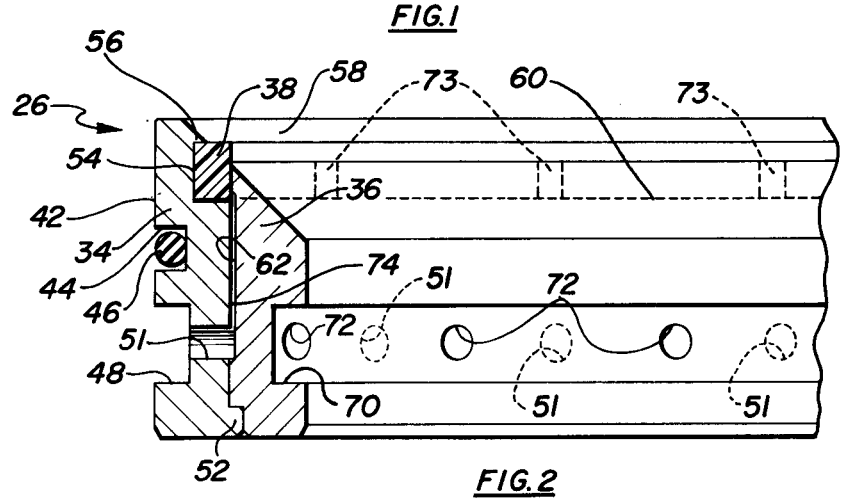
FIG. 2 is an enlarged section of the seat ring construction shown in FIG. 1 for use with lubricated style valves.

FIG. 1 illustrates a top entry trunnion style spherical plug valve indicated generally at 10 employing the seat ring structure of this invention indicated generally at 12. The spherical plug valve 10 has a valve body 14 forming a flow passageway 13 and a valve chamber in communication with flow passageway 13. A spherical plug member or ball 16 is mounted within the valve chamber and has a flow passage 17 therethrough. Valve body 14 has a removable top member or bonnet 18 secured thereto which allows spherical plug member 16 to be removed from the valve body without disturbing the end connection of the valve. Spherical plug member 16 is mounted for rotation between open and closed positions with its lower end having a stub shaft portion 19 forming a trunnion mounted in a bearing in valve body 14 and a stem 20 extending through bonnet 18. Spherical surface portions 22 form the outer sealing face of spherical plug member 16 and contact seat structure 12 for sealing in the open and closed positions. Seat structure 12 is positioned in seat pocket 24 in valve body 14, around flow passageway 13. The valve construction for a top entry style spherical plug valve 10 must necessarily be such that the seat rings and supporting structure therefor can be retracted or displaced outwardly relative to spherical plug member 16 so that plug member 16 can be inserted and removed from valve body 14. Seat structure 12 shown in FIG. 1 includes a seat ring, indicated generally at 26, a resilient seat ring urging member, indicated generally at 28, positioned behind seat ring 26, and a spacer, indicated generally at 30, positioned between resilient member 28 and the outermost end or bottom 32 of pocket 24. A lubricant passageway 33 is provided around the interior of seat pocket 24 and communicates with lubricant fitting 35 on the exterior of valve body 12. FIG. 2 shows seat ring 26 alone and in FIG. 3, it is shown in exploded view.

Referring to FIGS. 2 and 3, seat ring 26 includes an outer seat ring member 34 which surrounds an inner seat ring member 36 and a seal ring 38. Inner seat ring member 36 and outer seat ring 34 are secured together by a plurality of rivets, one of which is shown and indicated at 40. Seal ring 38 is preferably rectangular in cross section as shown and formed of a resilient material such as polytetrafluoroethylene. Outer seat ring member 34 has an outer cylindrical surface 42 which is interrupted by an outer peripheral groove 44 receiving an O-ring 46, and another peripheral groove 48 for lubrication and recessing the heads of rivets 40. A plurality of spaced apertures or holes 50 are provided through seat ring member 34 for receiving the shank of rivets 40. Other lubricant openings 51 similar to apertures 50 are positioned about the circumference of seat ring member 34 and are employed as will be further explained for the passage of lubricants. The end portion of annular member 34 adjacent groove 48 has a radially inwardly extending abutment 52. The opposite end portion of outer seat ring member 34 has an inner groove 54 forming a seal pocket to receive seal ring 38. Groove 54 is defined by annular side wall 55 concentric with cylindrical surface 42, a radially disposed inwardly extending side or bottom, and an inwardly extending lip portion 56 on the valve member facing side of seal ring 38. The end of outer seat ring member 34 which faces spherical plug member 16 has a conically shaped end surface portion 58 outwardly divergent from inwardly extending lip 56.

Inner seat ring member 36 has a conically shaped end surface 60 which is essentially aligned in a conical plane with, and forms a continuation of, outer seat ring conical surface 58 when the two seat ring members 34 and 36 are positioned together as shown in FIG. 2. Seat ring member 36 is generally cylindrically shaped and has upper and lower outer peripheral surfaces 64 and 66 with an annular recessed portion 62 formed between peripheral surfaces 64 and 66. An outer annular notch 68 is formed along the lower edge of seat ring member 36. The interior of inner seat ring member 36 has a groove 70 around a mid-portion thereof. Groove 70 is positioned so that it is in radial alignment with groove 48 in outer seat ring member 34 when the seat ring members are positioned together. Groove 70 has a plurality of radially disposed and spaced apart apertures 72 therethrough. It is to be noted that apertures 72 align with apertures 50 at a plurality of points around the annular seat ring members to accept rivets 40. In addition, a number of alternates lubricants openings 51 similar to apertures 50 are positioned about the circumference of outer ring member 34. Openings 51 are not aligned with any openings in inner ring member 34 but communicate with recessed portion 62 to provide lubricant thereto. Referring to FIG. 2, when outer and inner seat members 34 and 36 are positioned together, recessed portion 62 forms a space or cavity 74 between the members and it is connected in fluid communication with the periphery of outer seat ring 34 by apertures 51 which are not occupied by rivets 40. Space 74 provides a fluid passageway through seat ring 26 to the inner annular portion of seal ring 38. A plurality of recesses or serrations 73 are formed in inner seal ring surface 64 to allow fluid lubricant or sealant to pass onto the inner annular surface portion of seal ring 38 from recessed portion 62 for lubricating, or emergency sealing between seal ring 38 and valve member 16.

Referring to FIG. 3, resilient seat ring urging member 28 and spacer 30 are shown with seat members 34 and 36. Spacer member 30 is of a split-ring construction formed of semicircular segments 76, 78, being generally channel-shaped in cross section and positioned in seat pocket 24 between seat pocket bottom wall 32 and the bottom side of the resilient seat ring urging member 28. Segments 76 and 78 are essentially as wide as seat pocket 24 to provide full support across the width of resilient seat ring urging member 28. Resilient seat ring urging member 28 is an annular member having a plurality of helical metal springs 80 encapsulated in an elastomeric material 82. Seat ring urging member 28 is of a rectangular cross section and has a channel shaped backup support member 84 secured on one end thereof as a stiffener. It is to be understood that other types of rigid stiffeners may be provided, if desired. The elastomeric material 82 is bonded to support member 84 and to springs 80 and may be formed of suitable elastomeric materials such as Buna-N synthetic rubber, epichlorohydrin, chloroprene rubber, or fluoroelastomers. The elastomeric material 82 protects springs 80, minimizes any permanent set in springs 80, and prevents foreign matter from being positioned within seat pocket 24. The mold for injecting the elastomeric material has projections thereon which fit within springs 80. Thus, when the mold is removed a generally cylindrical opening 85 is provided centrally of each spring 80. Openings 85 provide a space in which the elastomeric material may flow upon compression. A lip 86 on the outer periphery of elastomeric material 82 is received within a tapered edge portion of outer seat ring member 34.

FIG. 4 illustrates a modified seat ring structure indicated generally at 90 which is employed in non-lubricated valves and does not include any lubricant passages. Modified seat ring structure 90 is essentially the same as seat ring structure 12 except in regard to the lubricant passages. Inner annular seat ring member 36A has a conically shaped surface 94 on the end thereof which faces spherical plug member 16 and an inner peripheral groove 96. Inner seat ring member 36A has an essentially cylindrical outer or peripheral surface 98 extending from the end having a conical surface 94 toward the opposite end and terminating at a radially inwardly recessed portion 100. A plurality of apertures 102 through inner seat ring member 36A are located in groove 96 and are aligned with apertures 50A in outer seat ring member 36A. A plurality of hollow core rivets 104 are mounted through aligned apertures 50A and 102 to secure inner and outer ring members 34A and 36A in tight fitting relation. Seat ring structure 90 does not include any lubricant passageways and is to be used in non-lubricated type valves.

FIG. 5 shows the present invention in use with a typical end opening non-lubricated type spherical plug valve indicated generally at 110, and employing the novel seat structure of this invention including the seat ring as shown in FIG. 4. Valve 110 has a body 112 with a flow passage therein communicating with a valve chamber which encloses a spherical plug member 114 mounted therein for movement between open and closed positions. A seat pocket 116 in valve body 112 mounts seat ring 90 and resilient seat urging member 28. A stem 118 extends through valve body 112 and is connected to spherical plug member 114. Valve 110 has a tailpiece 120 which in use is mounted on or cooperatively engaged with valve body 112. Tailpiece 120 has a seat pocket 122 in a portion which mates with valve body 112 and a passageway for communicably connecting the valve chamber with the exterior of the valve through the seat pocket. Seat pocket 122 has seat member 90 and resilient seat urging member 28 mounted therein. Because of the removably mounted tailpiece 120, valve 110 does not require the use of a spacer member in the seat pockets behind the resilient seat urging members. The removal of tailpiece 120 allows assembly and disassembly of the valve without resorting to displacing the seats rings prior to removal of spherical plug member 114. While a non-lubricated type valve is shown in FIG. 5, it is to be understood that if desired, lubricated seats and appropriate lubricant passageways can be provided as shown in FIGS. 2 and 3.

FIG. 6 illustrates a separate embodiment of the resilient seat urging member with such indicated generally at 126. Seat urging member 126 is an annular member with an essentially rectangular cross section constructed of an elastomeric material having a metal angle-shaped support member 128 bonded to one corner thereof. One leg of angle-shaped support member 128 rests on the bottom of the seat pocket and the other leg forms an inner periphery of seat urging member 126. A plurality of apertures 136 are provided through resilient seat urging member 126 between opposed ends thereof so the apertures will lie essentially parallel to the valve flow passageway when the seat urging member is installed. In compression, seat urging member 126 acts as a spring to urge an adjacent seat ring toward the valve member. The size and number of apertures 136 can be changed as desired to regulate the spring rate of the resilient seat urging member.

FIG. 7 illustrates another embodiment of the annular resilient seat urging member of this invention with such indicated generally at 138. Resilient urging member 138 is generally of a rectangular cross section with a generally V-shaped groove 140 formed in the outer periphery thereof and comprised of an elastomeric material 142 bonded to a rigid angle-shaped support member 144. Backup support member 144 has one leg 146 adapted to be positioned in the bottom of the seat pocket when the member is installed. The other leg 148 of backup support member 144 forms a part of the inner circumference of resilient seat urging member 138. When mounted in a seat pocket in a valve, resilient seat urging member 138 is compressed and functions as a spring. The precise shape and form of V-shaped groove 140 can be modified as desired to produce a desired resiliency or overall spring rate for seat urging member 138.

FIG. 8 illustrates or shows another embodiment of the annular resilient seat urging member of this invention which can be used therein. Annular seat urging member 150 is rectangular in cross section and comprises an outer elastomeric member 152 having a metallic stiffener member 154 positioned generally centrally of its cross section and bonded thereto. In use, the size and shape of stiffener member 154 can be changed along with the consistency and resiliency of elastomeric member 152 to regulate the spring rate of seat urging member 138. It is to be understood that any of the resilient seat urging members shown in FIGS. 6, 7, and 8 can be used with either of the specific seat ring constructions illustrated and described herein.

In the use of the seat ring construction of this invention, it is to be noted that such can be easily constructed by fabricating the inner annular ring member and the outer annular ring member separately and adjoining them together with the seal ring in a rather simple manufacturing process. Because the seat ring of this invention is constructed in separate members in the manner shown, it can be easily disassembled for repair or replacement of the seal ring which overcomes a major disadvantage of prior art devices in that such was difficult or impossible to do heretofore. Further, it is to be noted that by providing a resilient seat urging member of any of the physical embodiments illustrated and described herein with such filling the void of the seat pocket behind the seat ring, foreign matter is prevented from entering the seat pocket behind the seat ring and interfering with the action of the spring or seat urging structure.

What is claimed is:

1. A spherical plug valve, comprising:

a. a valve body having a valve chamber therein, flow passageways through said valve body in communication with said valve chamber, a spherical plug member positioned in said valve chamber movable between open and closed positions relative to said flow passageways and a lubricant passageway through said valve body for seat lubrication, b. an annular seat pocket in said valve body around at least one of said flow passageways and having a seat supporting abutment, c. a seat ring positioned in said seat pocket having inner and outer concentric seat members of generally cylindrical form arranged in juxtapositioned relation to each other, and a seal ring mounted between said seat members and having an end portion in contact with the exterior surface of said spherical plug member, said outer seat member having an inside peripheral surface facing said inner concentric seat member, a seal ring mounting groove around said inside peripheral surface at one end portion thereof to receive and mount said seal ring, and said outer seat member having a lubricant groove around a mid-portion of the outer peripheral surface thereof, said inner seat member having an outer peripheral surface adjacent said outer seat member inside surface with one end of said outer peripheral surface overlying a mid-portion of said seal ring such that said inner seat member retains said seal ring in said seal ring mounting groove, d. said outer seat member having a plurality of circumferentially spaced apertures therearound which are radially disposed relative to the seat members and located in said peripheral lubricant groove, said inner seat member having a plurality of circumferentially spaced apertures therethrough aligned with said apertures through said outer seat member, and a plurality of fasteners extending through said apertures in said seat members to secure said seat members together;

e. cooperating means on said inner seat member and said outer seat member to longitudinally position said seat members such that said circumferentially spaced apertures of both said seat members are aligned to facilitate mounting said fasteners, f. said seat members each having an outer end which is opposite to said seal ring and oriented generally transverse to the longitudinal axis of said flow passageways, and g. resilient means in said seat pocket contacting the outer ends of said seat members to urge said seat ring toward and into fluid-tight sealing contact with said spherical plug member.

2. The spherical plug valve of claim 1 wherein:

a. said outer seat member has a peripheral seal groove around the exterior thereof between said lubricant groove and said spherical plug member with an O-ring mounted in said peripheral seal groove, b. said resilient means has a plurality of circumferentially spaced helical compression springs in longitudinal alignment with said passageways, said springs being encapsulated in a ring of elastomeric material and being positioned between opposing sides of a cross-sectionally U-shaped annular support member.

3. The spherical plug valve of claim 2, wherein:

a. said valve body has an opening therein to permit placement of said spherical plug member and said seat ring into said valve chamber through said opening, b. said seat pocket being sufficiently deep to permit said seat members and said resilient means to be placed in said seat pocket in a retracted position such that said spherical plug member can be inserted into said valve chamber through said valve body opening, and c. said resilient means further includes a segmented annular spaced positioned between said annular support member and said seat pocket to position said seat ring against said spherical plug member.

4. A spherical plug valve, comprising:

a. a valve body having a valve chamber therein, flow passageways through said valve body in communication with said valve chamber, a spherical plug member positioned in said valve chamber movable between open and closed positions relative to said flow passageways and a lubricant passageway through said valve body for seat lubrication, b. an annular seat pocket in said valve body around at least one of said flow passageways and having a seat supporting abutment, c. a seat ring positioned in said seat pocket having inner and outer concentric seat members of generally cylindrical form arranged in juxtapositional relation to each other, and a seal ring mounted between said seat members and having an end portion in contact with the exterior surface of said spherical plug member, said outer seat member having an inside peripheral surface facing said inner concentric seat member, a seal ring mounting groove around said inside peripheral surface at one end portion thereof to receive and mount said seal ring, and said outer seat member having a lubricant groove around a mid-portion of the outer peripheral surface thereof, said inner seat member having an outer peripheral surface adjacent said outer seat member inside surface with one end of said outer peripheral surface overlying a mid-portion of the inner surface of said seal ring such that said inner seat member retains said seal ring in said seal ring mounting groove, d. said outer seat member having a plurality of circumferentially spaced apertures therearound which are radially disposed relative to the seat members and located in said peripheral lubricant groove, said inner seat member having a plurality of circumferentially spaced apertures therethrough aligned with said apertures through said outer seat member, a plurality of fasteners extending through said apertures in said seat members to secure said seat members together, said outer seat member having a greater number of said circumferentially spaced apertures therethrough than said inner seat member, e. a lubricant passageway between said seat members connecting said outer seat member circumferentially spaced apertures and said seal ring and including an annular space between said outer seat member inside peripheral surface and the outer peripheral surface of said inner concentric seat member, said annular space extending between said outer seat member circumferentially spaced apertures to said seal ring, said lubricant passageway including a plurality of circumferentially spaced recesses aligned with said flow passageways and located in the outer peripheral surface of said lubricant groove to said seal ring inner surface, f. cooperating means on said inner seat member and said outer seat member to longitudinally position said seat members such that said circumferentially spaced apertures of both said seat members are aligned to facilitate mounting said fasteners, g. said seat members each having an outer end which is opposite to said seal ring and oriented generally transverse to the longitudinal axis of said flow passageways, and h. resilient means in said seat pocket contacting the outer ends of said seat members to urge said seat ring toward and into fluid-tight sealing contact with said spherical plug member.

5. The spherical plug valve of claim 4, wherein:

a. said outer seat member has a peripheral seal groove around the exterior thereof between said lubricant groove and said spherical plug member with an O-ring mounted in said peripheral seal groove, and b. said resilient means has a plurality of circumferentially spaced helical compression springs in longitudinal alignment with said passageways, said springs being encapsulated in a ring of elastomeric material and being positioned between opposing sides of a cross-sectionally U-shaped annular support member.

6. The spherical plug valve of claim 5, wherein:

a. said valve body has an opening therein to permit placement of said spherical plug member and said seat ring into said valve chamber through said opening, b. said seat pocket being sufficiently deep to permit said seat member and said resilient means to be placed in said seat pocket in a retracted position such that said spherical plug member can be inserted into said valve chamber through said valve body opening, and c. said resilient means further includes a segmented annular spacer positioned between said annular support member and said seat pocket to position said seat ring against said spherical plug member.

* * * * *